(12) United States Patent
Curtis et al.

(10) Patent No.: US 9,022,176 B2
(45) Date of Patent: May 5, 2015

(54) TEMPERATURE MANAGEMENT SYSTEM FOR TRANSMISSION

(75) Inventors: Tami A. Curtis, South Lyon, MI (US); Michael L. Duhaime, Northville, MI (US); Anthony P. Tata, Fenton, MI (US); Peter Donald Bock, Commerce Township, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 318 days.

(21) Appl. No.: 13/273,822

(22) Filed: Oct. 14, 2011

(65) Prior Publication Data
US 2013/0092349 A1 Apr. 18, 2013

(51) Int. Cl.
*F01M 5/00* (2006.01)
*F01M 1/00* (2006.01)
*F16H 57/04* (2010.01)
*F16N 39/02* (2006.01)

(52) U.S. Cl.
CPC ............ *F16H 57/0413* (2013.01); *F16N 39/02* (2013.01); *F01M 5/002* (2013.01)

(58) Field of Classification Search
USPC ................ 184/6, 6.21, 6.12, 6.22; 165/51, 52
See application file for complete search history.

(56) References Cited

U.S. PATENT DOCUMENTS

| | | | |
|---|---|---|---|
| 3,831,381 A * | 8/1974 | Swearingen ..................... 60/657 |
| 5,749,439 A * | 5/1998 | Van Maanen ................ 184/6.12 |
| 6,427,640 B1 * | 8/2002 | Hickey et al. .............. 123/41.31 |
| 8,381,509 B2 * | 2/2013 | Bulin et al. ..................... 60/204 |
| 2002/0139355 A1 * | 10/2002 | Gracyalny et al. ............. 123/516 |
| 2008/0041046 A1 * | 2/2008 | Bering ............................ 60/320 |
| 2008/0110596 A1 * | 5/2008 | Schwarz et al. .......... 165/104.11 |
| 2008/0121376 A1 * | 5/2008 | Schwarz et al. .......... 165/104.28 |
| 2013/0086909 A1 * | 4/2013 | Wang et al. ..................... 60/730 |
| 2013/0104559 A1 * | 5/2013 | Papa et al. ....................... 60/772 |

* cited by examiner

*Primary Examiner* — William E Dondero
*Assistant Examiner* — Minh Truong

(57) ABSTRACT

An active/passive system for managing the temperature of fluid within an automatic transmission includes two heat exchangers, an active solenoid valve and a passive wax motor valve. A first heat exchanger provides transmission fluid heating and receives a flow of engine coolant. A second heat exchanger provides transmission fluid cooling and is exposed to ambient air. The solenoid valve which is preferably driven by a signal from a transmission control module (TCM) and the wax motor valve cooperate to provide three states of operation: transmission fluid heating, that is, heat added, cooling, that is, heat removed and pass-through or bypass (without heating or cooling).

15 Claims, 2 Drawing Sheets

TEMPERATURE MANAGEMENT SYSTEM FOR TRANSMISSION

FIELD

Figure 1:
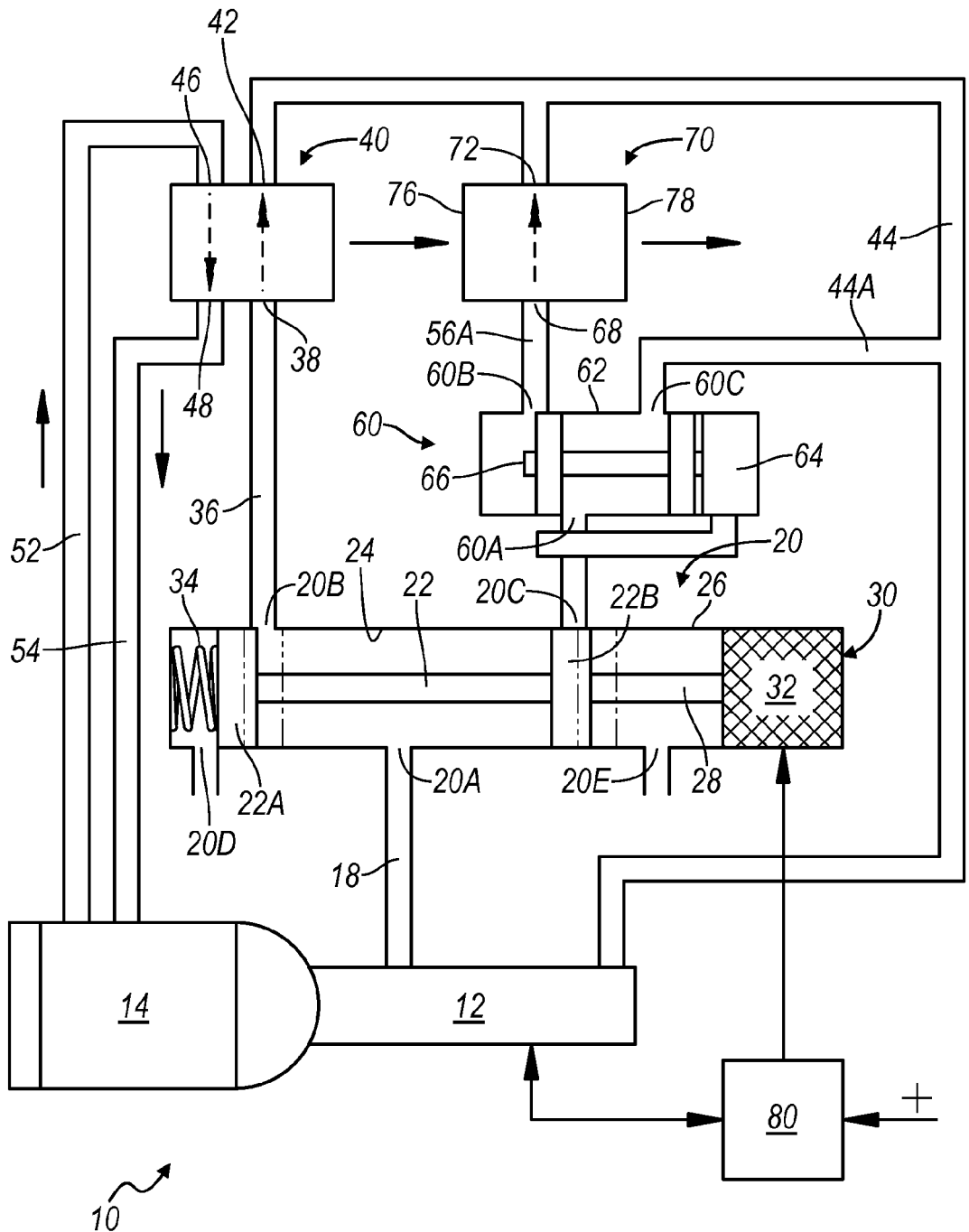

The present disclosure relates to a system for managing the temperature of an automatic transmission and more particularly to a two valve system for managing the temperature of fluid within an automatic transmission.

BACKGROUND

The statements in this section merely provide background information related to the present disclosure and may or may not constitute prior art.

Modern automatic motor vehicle transmissions utilize a several quart or liter fill of transmission fluid (hydraulic oil). The transmission fluid serves several purposes. First and most obvious is the lubrication of the numerous rotating and moving parts within the transmission. Second is the transfer of heat out of the transmission to maintain an appropriate operating temperature and third is use in the pressurized hydraulic control system of the transmission.

To achieve proper heat transfer to the ambient, a transmission oil cooler remote from the transmission is provided with a flow of transmission fluid. The oil cooler may be mounted within the vehicle radiator in which case heat is first transferred to engine coolant within the radiator and thence to the ambient or the oil cooler may be directly exposed to air flow, for example, through the engine compartment.

Such a device addresses only one aspect of transmission fluid temperature control however: ensuring that the transmission fluid temperature and thus the internal components of the transmission do not exceed design operating limits. While such a purpose is of great importance, there are other operating considerations relating to transmission fluid temperature. For example, when a vehicle and its transmission are started in cold weather, the viscosity of the cold transmission fluid can cause significant parasitic frictional losses. Depending upon the temperature, it can be several minutes before the transmission fluid temperature rises into a range where frictional losses become negligible. This delay is primarily due to the fact that only frictional heating from the rotation of parts heats the transmission fluid. During this time, fuel economy can be significantly degraded.

It is therefore apparent that improved control of automatic transmission fluid temperature is desirable.

SUMMARY

The present invention provides an active/passive system for managing the temperature of fluid within an automatic transmission. The system receives a flow of transmission fluid from the transmission and includes a first heat exchanger for transferring heat from engine coolant to the transmission fluid, a second heat exchanger for transferring heat from the transmission fluid to the ambient, a first, two position, diverter spool valve for directing transmission fluid to a first path which includes the first heat exchanger or a second path which includes a second, bypass valve which directs fluid flow to either the second heat exchanger the or bypasses it and returns the fluid to the transmission. The first, two position valve is solenoid operated by a signal from a transmission control module (TCM) or engine control module (ECM) and the second, bypass valve is preferably controlled by a passive wax motor.

When the transmission and transmission fluid is cold or below a threshold design temperature, the solenoid of the first, two position diverter valve is activated and fluid flow is directed to the first heat exchanger where heat in the engine coolant is transferred to the transmission fluid to assist its warming up. As the temperature of the transmission and transmission fluid rises and passes the same or a related threshold design temperature, the solenoid is deactivated and the first valve directs fluid flow to the second path. Typically at this time, the wax motor will be cold and the flow of transmission fluid will be returned to the transmission. As the temperature of the transmission and the transmission fluid continue to rise, the wax motor will sense this and translate the bypass valve to direct fluid flow to the second heat exchanger which will transfer heat to the ambient and lower the temperature of the transmission fluid.

An alternate embodiment system for managing the temperature of fluid within an automatic transmission includes two solenoid operated valves that may be controlled by two outputs from a transmission control module and which provide the three states of operation: transmission fluid circulation without heat transfer, circulation with heat transfer in from the engine coolant and circulation with heat transfer out to the ambient.

Thus it is an aspect of the present invention to provide a system for managing the temperature of fluid within an automatic transmission.

It is a further aspect of the present invention to provide an active/passive system for managing the temperature of fluid within an automatic transmission.

It is a still further aspect of the present invention to provide a system for managing the temperature of fluid within an automatic transmission having a first heat exchanger for transferring heat from engine coolant.

It is a still further aspect of the present invention to provide a system for managing the temperature of fluid within an automatic transmission having a second heat exchanger for transferring heat to the ambient.

It is a still further aspect of the present invention to provide a system for managing the temperature of fluid within an automatic transmission having a two position solenoid operated valve.

It is a still further aspect of the present invention to provide a system for managing the temperature of fluid within an automatic transmission having a bypass valve operated by a wax motor.

It is a still further aspect of the present invention to provide a system for managing the temperature of fluid within an automatic transmission having a pair of heat exchangers and a pair of valves each having a inlet and a pair of outlets.

It is a still further aspect of the present invention to provide a system for managing the temperature of fluid within an automatic transmission having a pair of heat exchangers and a pair of solenoid valves.

Further advantages, aspects and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
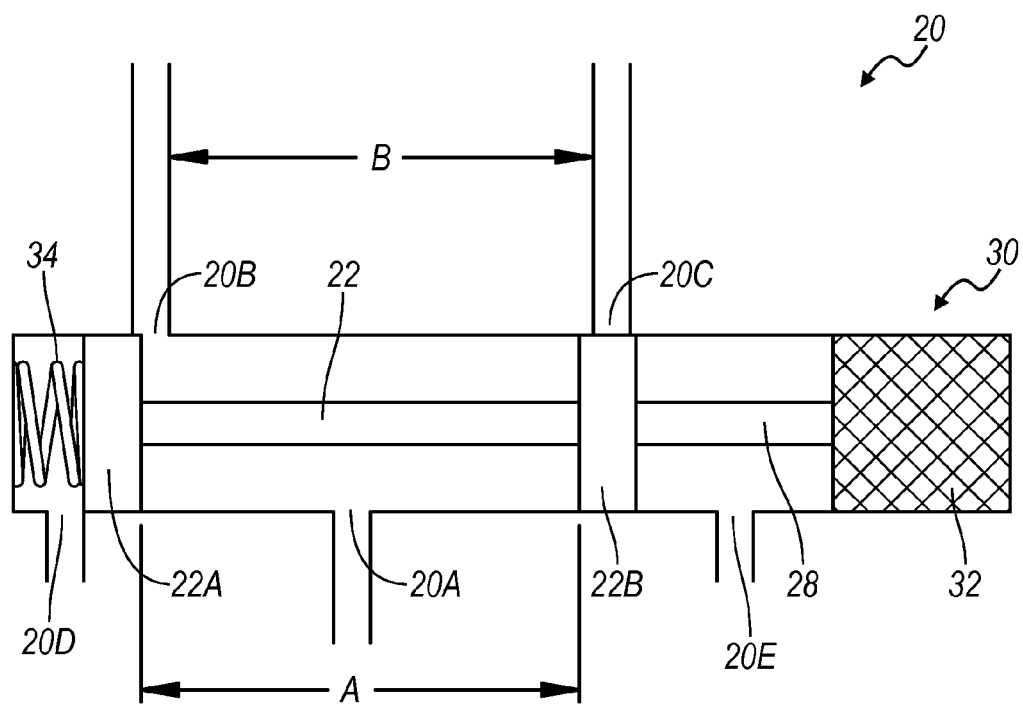

FIG. 1 is a schematic view of a temperature management system according to the present invention associated with an automatic transmission; and FIG. 2 is an enlarged, cross sectional view of a logic or spool valve showing the non-overlapping operation of the pistons.

DETAILED DESCRIPTION

The following description is merely exemplary in nature and is not intended to limit the present disclosure, application, or uses.

With reference now to FIG. 1, a temperature management system which is illustrated in association with an automatic transmission is generally designated by the reference number 10. The temperature management system 10 is utilized in conjunction with an automatic transmission 12 which, in turn, is utilized in conjunction with a prime mover 14 such as an internal combustion gas, Diesel or flex fuel engine or other power plant, e.g., hybrid.

The temperature management system 10 includes a hydraulic supply line 18 which receives a flow of hydraulic fluid (transmission oil) under pressure from the automatic transmission 12 and provides it to an inlet port 20A of a first, three way, two position diverter spool valve 20. The three way spool valve 20 includes a spool 22 having spaced apart lands or pistons 22A and 22B which translate within a circular bore 24 defined by a cylindrical housing 26. The spool 22 is connected to and translated by a plunger 28 of a solenoid assembly 30 which is disposed and translates within a solenoid coil 32. When the solenoid coil 32 is energized, the plunger 28 and the spool 22 translate to the left, to the position illustrated in FIG. 1. When the solenoid coil 32 is de-energized, the plunger 28, the spool 22 and the lands or pistons 22A and 22B translate to the right, to the positions illustrated in dashed lines in FIG. 1.

Note that in the energized (left) position of the spool 22, the land or piston 22B fully closes off the port 20C and in the right (de-energized) position of the spool 22, the land or piston 22A fully closes off the port 20B. A compression spring 34 is disposed between the end of the spool 22 opposite the solenoid assembly 30 and an end of the cylindrical housing 26 and biases the spool 22 and the plunger 28 to the right in FIG. 1.

The cylindrical housing 26 also defines a first outlet port 20B and a second outlet port 20C as well as two exhaust or vent ports 20D and 20E. When the solenoid coil 32 is energized oil or fluid flows from the inlet port 20A out through the first outlet port 20B. The first outlet port 20B communicates through a first oil or fluid line 36 to an oil inlet 38 of a first heat exchanger 40. The first heat exchanger 40 includes a first plurality of tubes or passageways (not illustrated) that communicate between the oil inlet 38 and an oil outlet 42. The oil outlet 42 of the first heat exchanger 40 communicates through a fluid return line 44 with the automatic transmission 12.

The first heat exchanger 40 also includes a second plurality of tubes or passageways (also not illustrated) which are interleaved and in thermal communication with, but provide flow isolated from, the first tubes or passageways. A coolant inlet 46 communicates through the second plurality of tubes or passageways with a coolant outlet 48. The coolant inlet 46 and the coolant outlet 48 are connected by a coolant supply line 52 and a coolant return line 54, respectively, to appropriate coolant passageways in the prime mover 14.

When the solenoid coil 32 in de-energized, a flow path from the inlet port 20A to the second outlet port 20C is established and a second oil or fluid line 56 to an inlet port 60A of second, three way diverter or bypass valve assembly 60. The second diverter valve assembly 60 includes a housing 62 which defines the inlet port 60A as well as a first outlet port 60B and a second outlet port 60C. The second, bypass valve assembly 60 also includes a wax motor 64 that preferably senses the temperature of the transmission fluid or oil in the second fluid line 56 by, for example, exposing the housing of the wax motor 64 to flow in the second fluid line 56 or a similar method of heat transfer. The wax motor 64 drives a linearly translating valve member 66 that directs transmission fluid or oil flow through the second outlet port 60C to a bypass or return line 44A which may be an extension of the return line 44 when the transmission fluid is relatively cool. As the temperature rises in the second fluid line 56, wax in the wax motor 64 heats, translates and repositions the valve member 66 to close off the second outlet port 60C and the bypass or return line 44A and open the first outlet port 60B and an extension of the second fluid line 56, designated 56A. The extension of the second fluid line 56A communicates with an oil inlet 68 of a second heat exchanger 70. The second heat exchanger 70 includes a first plurality of tubes or passageways (not illustrated) that communicate between the oil inlet 68 and an oil outlet 72. The oil outlet 72 of the second heat exchanger 70 communicates through the fluid return line 44 with the automatic transmission 12.

The second heat exchanger 70 also includes a second plurality of tubes or passageways (also not illustrated) which are interleaved and in thermal communication with, but flow isolated from, the first tubes or passageways. An air inlet 76 communicates through the second plurality of tubes or passageways with an air outlet 78. Thus, when the wax motor 64 repositions the valve member 66 to direct transmission fluid flow through the extension of the second fluid or oil line 56, the second heat exchanger 70 transfers heat from the transmission fluid to the ambient air, thereby cooling the transmission fluid.

A transmission control module or TCM 80 which is typically associated with and which controls the automatic transmission 12 is provided with data, e.g., internal temperature, from the transmission 12 and provides an electrical signal to the solenoid coil 32 when the temperature of the transmission 12 is below a predetermined threshold valve. Alternatively, such control may be provided and commanded by an engine control unit (ECU) or a body control unit (BCU).

As an additional alternative, the second valve assembly 60 and specifically the wax motor 64 may be replaced with a second, electrically driven solenoid valve having the same configuration, namely, one inlet 60A and two outlets 60B and 60C which is under the control of the transmission control module, the engine control unit or the body control unit 80.

As illustrated in FIG. 2, the first, two position spool valve 20 includes the spool 22 having axially spaced apart lands or pistons 22A and 22B which translate within the circular bore 24 defined by the cylindrical housing 26. The axial spacing "A" between the adjacent (inner) faces of the lands or pistons 22A and 22B is greater than the adjacent edge distance "B" between the first outlet port 20B and the second outlet port 20C in the cylindrical housing 26. As such, the lands or pistons 22A and 22B cannot close off both of the outlet ports 20B and 20C at the same time. Stated somewhat differently, at least one of the outlet ports 20B or 20C will always be at least partially open, thereby providing a fail-safe feature by ensuring that there will always be a flow of transmission fluid through the valve 20 and one of the heat exchangers 40 or 70. This same axial distance relationship may, and preferably will be, utilized in the second diverter valve 60.

The description of the invention is merely exemplary in nature and variations that do not depart from the gist of the invention are intended to be within the scope of the invention. Such variations are not to be regarded as a departure from the spirit and scope of the invention.

What is claimed is:

1. A control system for controlling temperature of hydraulic fluid in a motor vehicle automatic transmission comprising, in combination,
    a first three way, two position valve having a fluid inlet supplied with said hydraulic fluid from said transmission, a first fluid outlet and a second fluid outlet, said first valve having a first position directing fluid to said first fluid outlet and a second position directing fluid to said second fluid outlet,
    a first heat exchanger having a first flow path and a second flow path, said first heat exchanger operable to transfer heat from said second flow path to said first flow path, said first flow path of said first heat exchanger including a first inlet in fluid communication with said first fluid outlet of said first three way valve and a first outlet, said second flow path of said first heat exchanger including a second inlet in fluid communication with engine coolant and isolated from and in thermal communication with said first flow path of said first heat exchanger,
    a second three way valve having a fluid inlet in direct fluid communication with only said second fluid outlet of said first three way valve, a first fluid outlet and a second fluid outlet, said second fluid outlet of said second three way valve in fluid communication with said first outlet of said first heat exchanger, and
    a second heat exchanger having a first flow path and a second flow path, said second heat exchanger operable to transfer heat from said first flow path to said second flow path, said first flow path including a first inlet in fluid communication with said first fluid outlet of said second three way valve and a first outlet in fluid communication with said first outlet of said first heat exchanger and said second fluid outlet of said second three way valve, said second flow path of said second heat exchanger isolated from and in thermal communication with said first flow path of said second heat exchanger, wherein said second flow path of said second heat exchanger is adapted to pass ambient air.

2. The temperature control system for an automatic transmission of claim 1 wherein said second fluid outlet of said first three way valve and said second fluid outlet of said second three way valve communicate through a return line to said automatic transmission.

3. The temperature control system for an automatic transmission of claim 1 wherein said first three way valve is a solenoid valve having a two piston spool and a return spring and said second three way valve includes a wax motor.

4. The temperature control system for an automatic transmission of claim 1 wherein said first flow paths of said first and said second heat exchangers are in fluid communication through a return line to said automatic transmission.

5. The temperature control system for an automatic transmission of claim 1 wherein said first three way valve includes a valve spool having at least two spaced apart pistons and a housing defining said first fluid outlet and said second fluid outlet, wherein said pistons are axially spaced apart a distance greater than a spacing between said outlets.

6. The temperature control system for an automatic transmission of claim 1 further including a transmission control module and wherein said first three way valve is a solenoid valve controlled by said transmission control module.

7. A control system for controlling temperature of hydraulic fluid in an automatic transmission of a motor vehicle comprising, in combination,
    a first two position diverter valve having a fluid inlet supplied with said hydraulic fluid from said transmission, a first fluid outlet and a second fluid outlet, said first diverter valve having a first position directing fluid to said first fluid outlet and a second position directing fluid to said second fluid outlet,
    a first heat exchanger having a first flow path and a second flow path, said first heat exchanger operable to transfer heat from said second flow path to said first flow path, said first flow path of said first heat exchanger including a first inlet in fluid communication with said first fluid outlet of said first diverter valve and a first outlet, said second flow path of said first heat exchanger including a second inlet in fluid communication with engine coolant and isolated from and in thermal communication with said first flow path of said first heat exchanger,
    a second diverter valve having a fluid inlet in direct fluid communication with only said second fluid outlet of said first diverter valve, a first fluid outlet and a second fluid outlet, said second fluid outlet of said second diverter valve in fluid communication with said first outlet of said first heat exchanger, and
    a second heat exchanger having a first flow path and a second flow path, said second heat exchanger operable to transfer heat from said first flow path to said second flow path, said first flow path including a first inlet in fluid communication with said first fluid outlet of said second diverter valve and a first outlet in fluid communication with said first outlet of said first flow path of said first heat exchanger and said second fluid outlet of said second diverter valve, said second flow path of said second heat exchanger isolated from and in thermal communication with said first flow path of said second heat exchanger, wherein said second flow path of said second heat exchanger is adapted to pass ambient air.

8. The temperature control system for an automatic transmission of claim 7 further including a transmission control module and wherein said first diverter valve is a solenoid valve controlled by said transmission control module.

9. The temperature control system for an automatic transmission of claim 7 wherein said first diverter valve includes a valve spool having at least two spaced apart pistons and a housing defining said first fluid outlet and said second fluid outlet, wherein said pistons are axially spaced apart a distance greater than a spacing between said outlets.

10. The temperature control system for an automatic transmission of claim 7 wherein said first diverter valve is a solenoid valve having a two piston spool and a return spring and said second diverter valve includes a wax motor.

11. The temperature control system for an automatic transmission of claim 7 wherein said second fluid outlet of said first diverter valve and said second fluid outlet of said second diverter valve communicate through a return line to a transmission.

12. A control system for controlling temperature of hydraulic fluid in an automatic transmission comprising, in combination,
    a first two position valve having a fluid inlet for receiving fluid from an automatic transmission, a first fluid outlet and a second fluid outlet, said first valve having a first position directing fluid to said first fluid outlet and a second position directing fluid to said second fluid outlet, a first heat exchanger having a first flow path and a second flow path, said first heat exchanger operable to transfer heat from said second flow path to said first flow path, said first flow path of said first heat exchanger including a first inlet in fluid communication with said first fluid outlet of said first valve and a first outlet, said second flow path of said first heat exchanger including a second inlet in fluid communication with engine coolant and isolated from and in thermal communication with said first flow path of said first heat exchanger, a second valve having a fluid inlet in direct fluid communication with only said second fluid outlet of said first valve, a first fluid outlet and a second fluid outlet, said second fluid outlet of said second valve in fluid communication with said second fluid outlet of said first valve, and a second heat exchanger having a first flow path and a second flow path, said second heat exchanger operable to transfer heat from said first flow path to said second flow path, said first flow path including a first inlet in fluid communication with said first fluid outlet of said second valve and a first outlet in fluid communication with said first outlet of said first path of said first heat exchanger and said second fluid outlet of said second valve, said second flow path of said second heat exchanger isolated from and in thermal communication with said first flow path of said second heat exchanger, wherein said second flow path of said second heat exchanger is occupied by ambient air.

13. The temperature control system for an automatic transmission of claim 12 wherein said first valve is a two position solenoid valve and said second valve includes a wax motor.

14. The temperature control system for an automatic transmission of claim 12 further including a transmission control module and wherein said first valve is a solenoid valve controlled by said transmission control module.

15. The temperature control system for an automatic transmission of claim 12 wherein said first valve includes a valve spool having at least two spaced apart pistons and a housing defining said first fluid outlet and said second fluid outlet, wherein said pistons are axially spaced apart a distance greater than a spacing between said outlets.

* * * * *